United States Patent
Wang et al.

(10) Patent No.: US 8,553,986 B2
(45) Date of Patent: Oct. 8, 2013

(54) METHOD FOR PROCESSING IMAGE AND SYSTEM PROCESSING THE SAME

(75) Inventors: Yi-Chun Wang, Kaohsiung (TW); Chih-Chi Chang, Hsinchu (TW); Guo-Zua Wu, Taichung (TW); Oscal Tzyh-Chiang Chen, Minxiong Township, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 203 days.

(21) Appl. No.: 12/964,022

(22) Filed: Dec. 9, 2010

(65) Prior Publication Data

US 2012/0051656 A1    Mar. 1, 2012

(30) Foreign Application Priority Data

Aug. 25, 2010    (TW) ............................... 99128473 A

(51) Int. Cl.
*G06K 9/46*    (2006.01)

(52) U.S. Cl.
USPC ........................................................ 382/201

(58) Field of Classification Search
None
See application file for complete search history.

(56) References Cited

U.S. PATENT DOCUMENTS

| | | | |
|---|---|---|---|
| 4,745,562 A | 5/1988 | Prazdny | |
| 6,262,737 B1 | 7/2001 | Li et al. | |
| 7,265,761 B2 | 9/2007 | Chou et al. | |
| 7,272,264 B2 | 9/2007 | ElShishiny et al. | |
| 7,821,583 B2 * | 10/2010 | Yeh et al. | 349/15 |
| 2005/0123190 A1 | 6/2005 | Zhang et al. | |
| 2008/0180522 A1 * | 7/2008 | Kim et al. | 348/50 |
| 2009/0002481 A1 * | 1/2009 | Kim et al. | 348/42 |
| 2010/0103169 A1 | 4/2010 | Zhang et al. | |

FOREIGN PATENT DOCUMENTS

TW    200925653 A    7/2009

OTHER PUBLICATIONS

"A H.264-Based Scheme for 2D to 3D Video Conversion", M.T. Pourazad, May 2009.*
Premaratne, P., et al; "Feature Based Stereo Correspondence using Moment Invariant;" IEEE; 2008; pp. 104-108.
Birchfield, S., et al; "Depth Discontinuities by Pixel-to-Pixel Stereo;" Proceedings of the 1998 IEEE International Conference on Computer Vision; 1998; pp. 1-8.
Wang, Z., et al; "Dimension-Free Affine Shape Matching Through Subspace Invariance;" IEEE; 2009; pp. 2482-2487.
Nalpantidis, L., et al; "Dense Disparity Estimation Using a Hierarchical Matching Technique from Uncalibrated Stereo Vision;" International Workshop on Imaging Systems and Techniques; May 2009; pp. 1-5.
TW Office Action dated May 29, 2013.

* cited by examiner

*Primary Examiner* — Stephen R Koziol
*Assistant Examiner* — Delomia Gilliard
(74) *Attorney, Agent, or Firm* — McClure, Qualey & Rodack, LLP

(57) ABSTRACT

An image processing method and a system for processing the same are provided. The image processing method includes the following steps. A first image having several first areas and a second image having several second areas are provided. Each first area has a first feature point having the largest or the smallest grey value in the first area. Each second area has a second feature point having the largest or the smallest grey value in the second area. A first relationship between the first feature points and a second relationship between the second feature points are created. The first and the second feature points are paired by a microprocessor according to the first and the second relationship.

18 Claims, 5 Drawing Sheets

METHOD FOR PROCESSING IMAGE AND SYSTEM PROCESSING THE SAME

This application claims the benefit of Taiwan application Serial No. 99128473, filed on Aug. 25, 2010, the subject matter of which is incorporated herein by reference.

BACKGROUND

1. Technical Field

The disclosure relates to an image processing method for pairing the images and a system for processing the same.

2. Description of the Related Art

Along with the advance in image technology, people can keep the images as a memory and can perform various processing methods to the images to create special effects. For example, people can create a 3-D image with a left-eye image and a right-eye image, or create a surrounding image with the images viewed from different angles.

However, before performing an image processing method, the selection of feature points and algorithm must be considered. In general, the more representational the feature points, the higher accuracy the image processing will have. The algorithm also affects the speed of image processing. Thus, the industries are dedicated to the search of more representational feature points and faster algorithms so as to increase the accuracy and speed of image processing.

SUMMARY

The disclosure is directed to an image processing method and a system for processing the same. The feature points having the largest or smallest grey value in an area are used for pairing the images.

According to a first aspect of the present disclosure, an image processing method including the following steps is provided. A first image having several first areas and a second image having several second areas are provided. Each first area has a first feature point having the largest or the smallest grey value in the first area. Each second area has a second feature point having the largest or the smallest grey value in the second area. A first relationship between the first feature points and a second relationship between the second feature points are created. The first and the second feature points are paired by a microprocessor according to the first and the second relationship.

According to a second aspect of the present disclosure, an image processing system including an image providing unit, an information creating unit and a pairing unit is provided. The image providing unit provides a first image having several first areas and a second image having several second areas. Each first area has a first feature point having the largest or the smallest grey value in the first area. Each second area has a second feature point having the largest or the smallest grey value in the second area. The information creating unit creates a first relationship between the first feature points and a second relationship between the second feature points. The pairing unit pairs the first feature points and the second feature points according to the first and the second relationship.

The above and other aspects of the disclosure will become better understood with regard to the following detailed description of the non-limiting embodiment(s). The following description is made with reference to the accompanying drawings.

DETAILED DESCRIPTION

Figure 1:
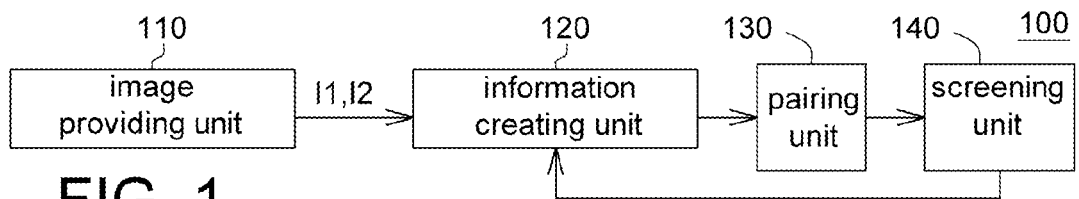
FIG. 1 shows a block diagram of an image processing system of an embodiment of the disclosure.

Referring to FIG. 1, a block diagram of an image processing system 100 of an embodiment of the disclosure is shown. The image processing system 100, which can be realized by such as a computer, a server or an integrated system formed by different electronic devices, includes an image providing unit 110, an information creating unit 120, a pairing unit 130 and a screening unit 140. The image providing unit 110 provides various images, and can be realized by such as a camera, a video recorder, a storage device storing several images, or a transmission line linked to the storage device. The information creating unit 120 creates various types of image information. The pairing unit 130 pairs the pixels of the images according to the created image information. The screening unit 140 screens the unpaired pixels. The information creating unit 120, the pairing unit 130 and the screening unit 140 disclosed above can be realized by such as a microprocessor, a firmware circuit or a computer readable medium storing several programming codes.

In the present embodiment of the disclosure, the image providing unit 110 provides a first image I1 and a second image I2. The pairing relationship between the first image I1 and the second image I2 can be created according to the calculation done by the information creating unit 120, the pairing unit 130 and the screening unit 140. If the first image I1 and the second image I2 respectively are a left-eye image and a right-eye image viewed from different view angles, then a 3-D image can be re-constructed according to the created pairing relationship. If the first image I1 and the second image I2 are two consecutive images at continuous time, then motion vector estimation can be executed to perform dynamic image re-construction according to the created pairing relationship.

Figure 2:
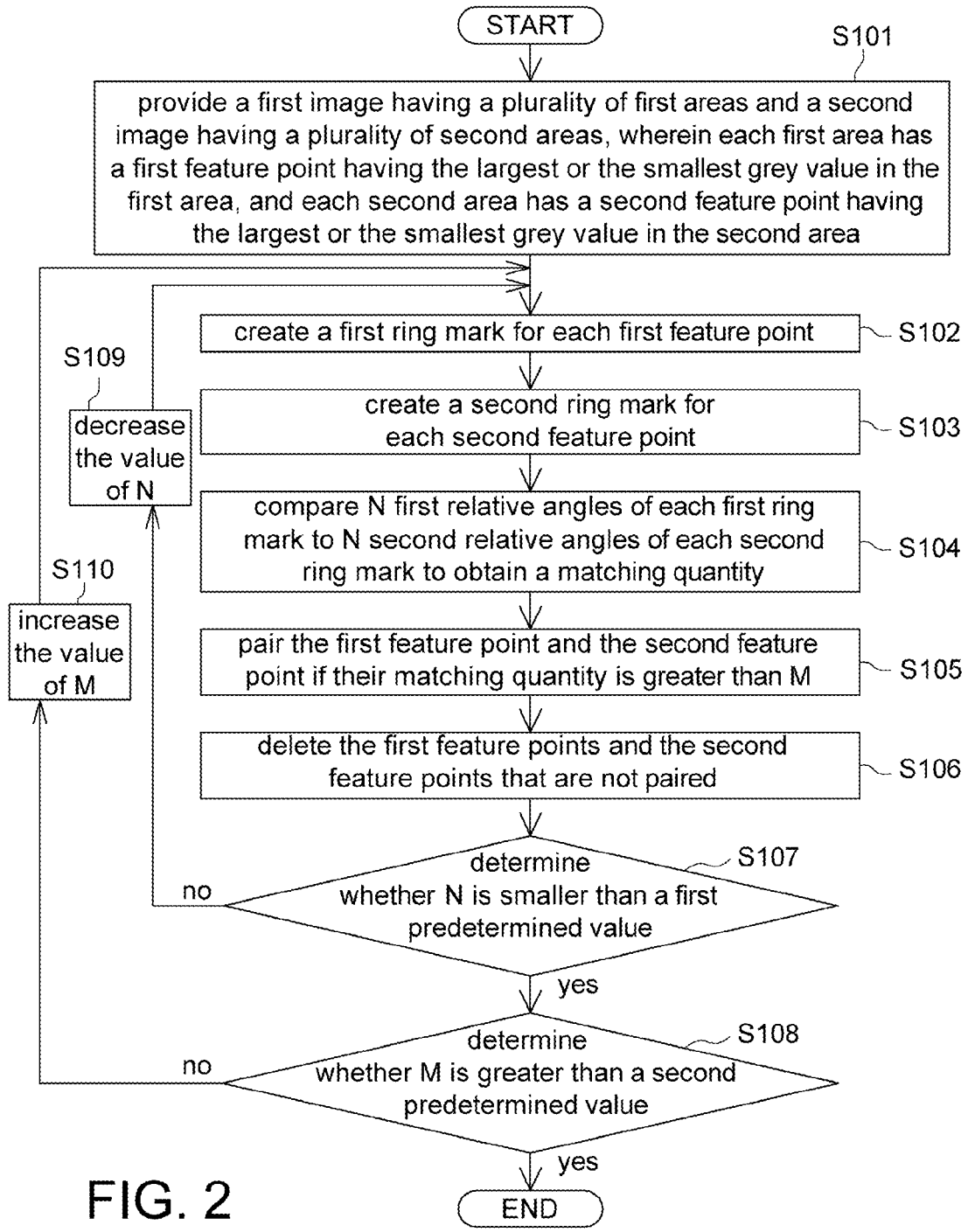
FIG. 2 shows a flowchart of an image processing method of an embodiment of the disclosure.

Referring to FIG. 2, a flowchart of an image processing method of an embodiment of the disclosure is shown. The image processing method of the present embodiment of the disclosure is exemplified below with an image processing system 100 and an accompanying flowchart. However, anyone who is skilled in the technology of the disclosure will understand the application of the image processing system 100 is not limited to the flowchart, and the application of the flowchart is not limited to the image processing system 100 and the order of the steps either.

Figure 3:
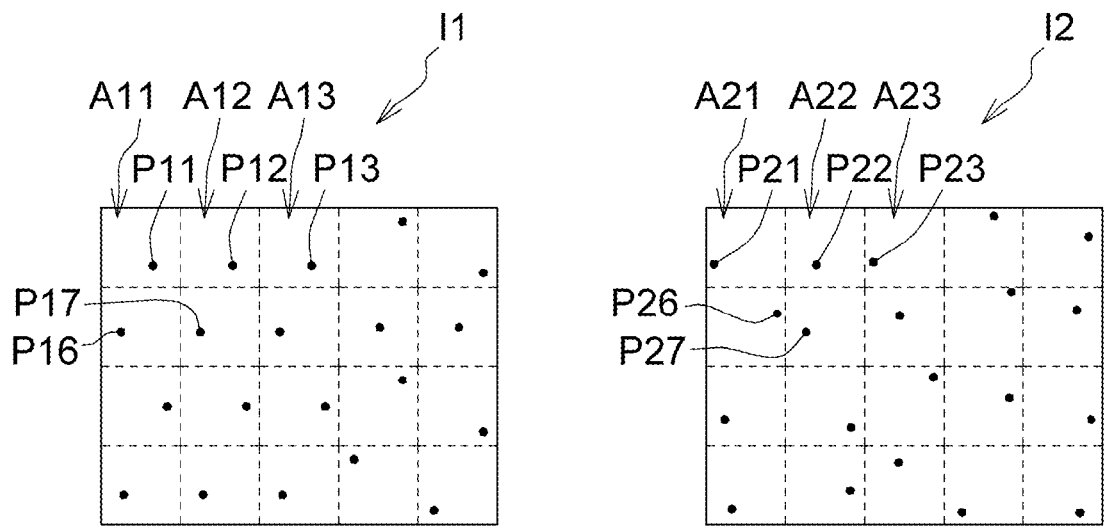
FIG. 3 is a schematic diagram illustrating an embodiment of a first image and a second image of the disclosure.

Firstly, the method begins at step S101, a first image and a second image are provided by an image providing unit 110. Let FIG. 3, which is a schematic diagram illustrating an embodiment of a first image I1 and a second image I2 of the disclosure, be taken for example. The first image I1 has several first areas (such as A11, A12, A13), each having a first feature point (such as P11, P12, P13). Each first feature point (such as P11) has the largest or the smallest grey value (the largest grey value is exemplified in FIG. 3) in the first area (such as A11). Likewise, the second image I2 has several second areas (such as A21, A22, A23), each second area having a second feature point (such as P21, P22, P23). Each second feature point (such as P21) has the largest or the smallest grey value (the largest grey value is exemplified in FIG. 3) in the second area (such as A21).

The first image I1 and the second image I2 are formed by several columns or several rows of pixels. In the present embodiment of the disclosure, each of the first areas (such as A11, A12, A13) and the second areas (such as A21, A22, A23) is a rectangular area formed by a number of the columns or a number of the rows of pixels. In another embodiment, each of the first areas and the second areas can be a L-shaped areas formed by a number of columns and a number of rows of pixels, a bar-shaped area formed by one single column of pixels, a bar-shaped area formed by one single row of pixels, or a L-shaped area formed by one single column and one single row of pixels.

Figures 4A, 4B:
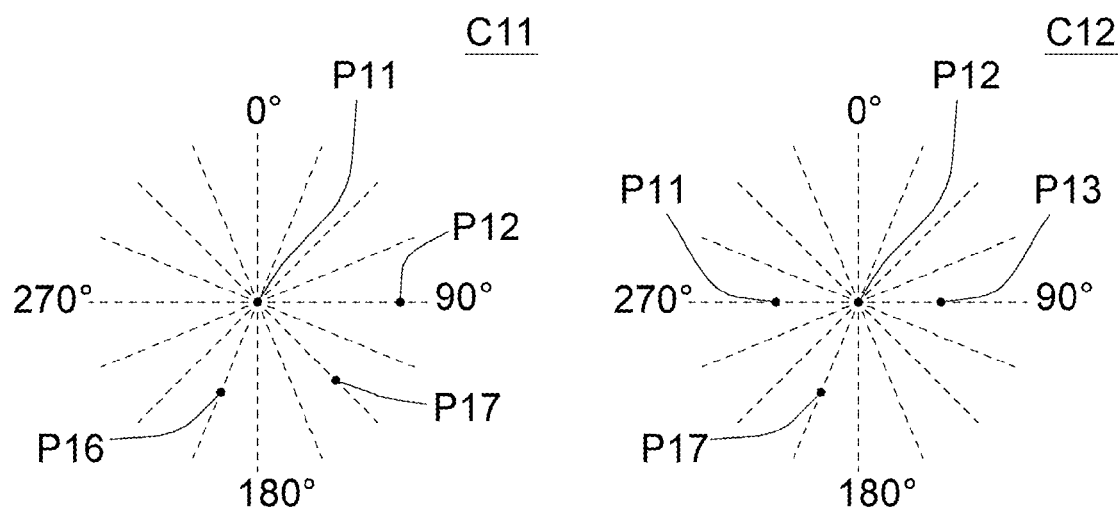
FIG. 4A is a schematic diagram illustrating an embodiment of a first ring mark of the disclosure.
FIG. 4B is a schematic diagram illustrating an embodiment of a second ring mark of the disclosure.

Next, the method proceeds to step S102, a first ring mark is created for each first feature point by the information creating unit 120. Let FIG. 3 and FIGS. 4A~4B be taken for example. FIGS. 4A~4B are schematic diagrams illustrating a first ring mark C11 and a second ring mark C12 of the disclosure. Each first ring mark (such as C11) records N first relative angles (such as 90°, 135°, 202.5°) between each first feature point (such as P11) and its nearest N (such as 3) first feature points (such as P12, P16, P17), wherein, N is an integer greater than or equal to 1.

In the first ring mark (such as C11), the neighboring first feature points (such as P12, P16, P17) are not necessarily positioned in a circle, and the first ring mark (such as C11) records the relative angles, not the distances, between the first feature points (such as P12, P16, P17).

Each first feature point (such as P11) can create a first ring mark (such as C11), and each first feature point (such as P11) can be recorded in the first ring mark (such as C12) of another first feature point (such as P12).

Figure 4C:
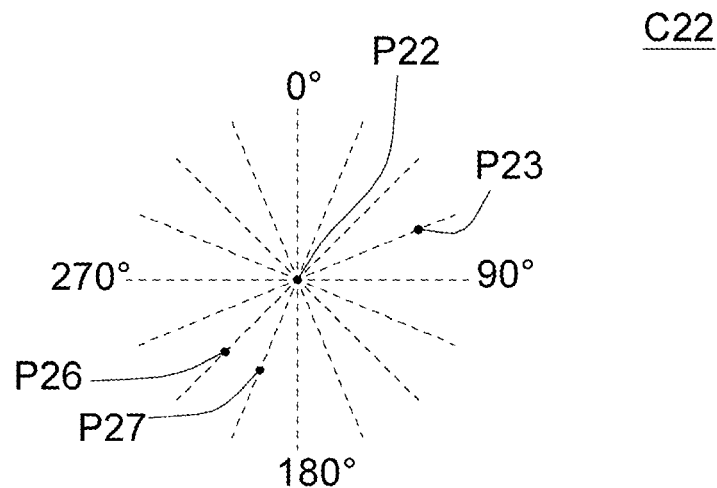
FIG. 4C is a schematic diagram illustrating an embodiment of a second ring mark of the disclosure.

Next, the method proceeds to step S102, a second ring mark is created for each second feature point by the information creating unit 120. Let FIG. 3 and FIG. 4C be taken for example. FIG. 4C is a schematic diagram illustrating an embodiment of a second ring mark C22 of the disclosure. Each second ring mark (such as C22) records N second relative angles between each second feature point (such as P22) and its neighboring N (such as 3) second feature points (such as P23, P26, P27). The second ring marks are similar to the first ring mark, and are not repeated here.

In above steps S102-S103, a first relationship between the first feature points and a second relationship between the second feature points are created by the information creating unit 120, wherein the first relationship relates to the first ring mark of each first feature point, and the second relationship relates to the second ring marks of each second feature point in the present embodiment.

Figure 5:
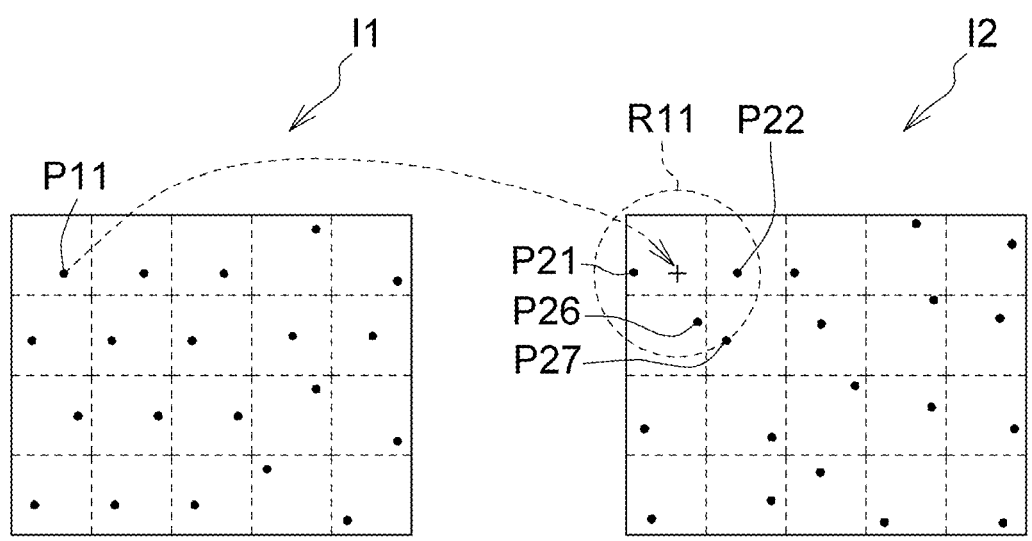
FIG. 5 is a schematic diagram illustrating an embodiment of a first image and a second image of the disclosure.
Figure 6A:
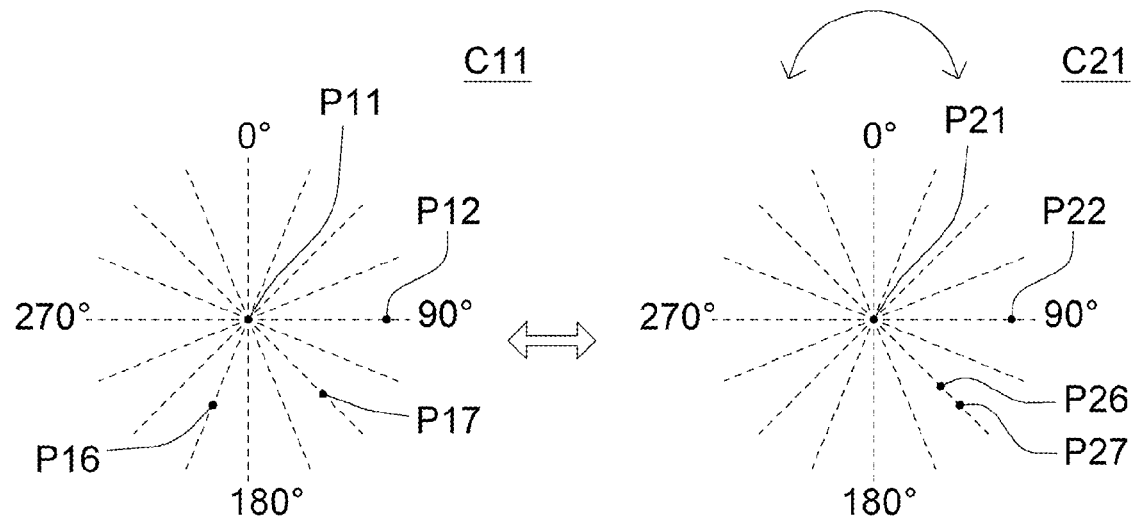
FIGS. 6A~6D are schematic diagrams illustrating an embodiment of a first ring mark and four second ring marks of the disclosure.
Figure 6B:
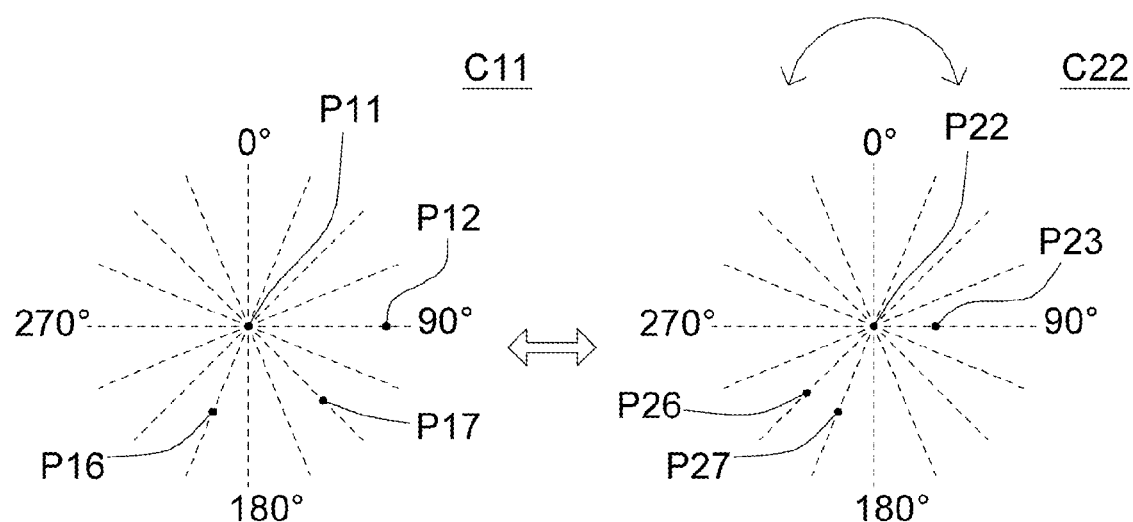
Figure 6C:
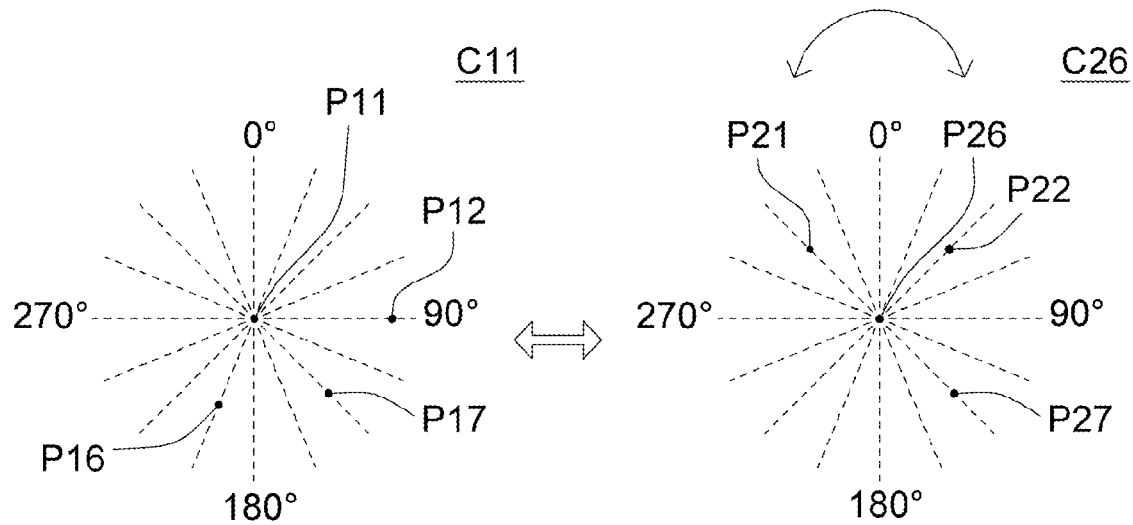
Figure 6D:
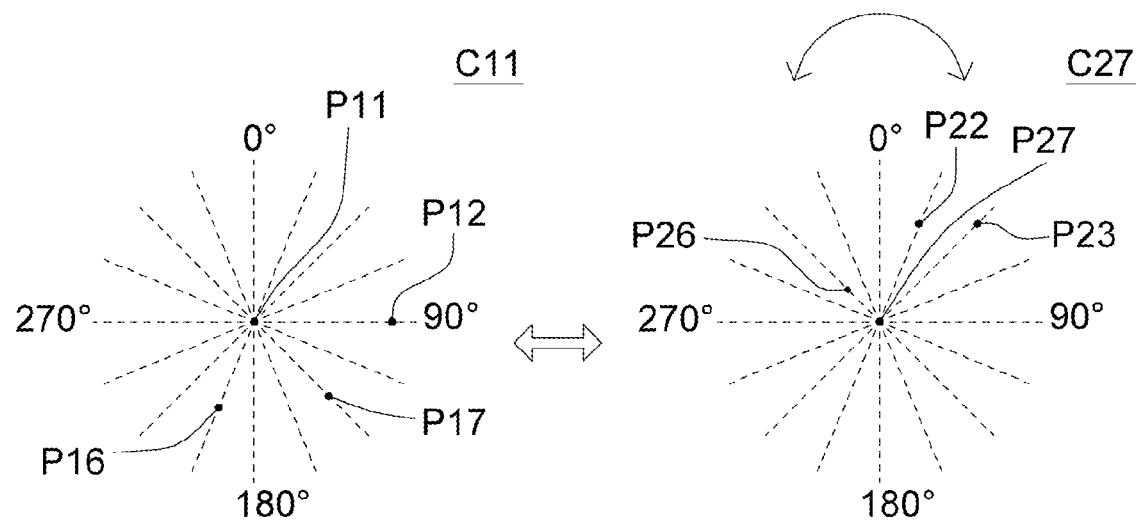

Then, the method proceeds to step S104, N first relative angles of each first ring mark are compared with N second relative angles of each second ring mark by the pairing unit 130 to obtain a matching quantity. Let FIG. 5, which is a schematic diagram illustrating an embodiment of a first image I1 and a second image I2 of the disclosure, be taken for example. In the present step, the pairing unit 130 selects a first feature point (such as P11) from the first image I1. There is a neighboring range (such as R11) at the same coordinate position of the second image I2 corresponding to the first feature point (such as P11). Several second feature points (such as P21, P22, P26, P27) are selected from the neighboring range (such as R11), wherein, the second feature points are selected according to the neighboring range, not the quantity. Therefore, there may be 2, 3, or even more second feature points selected in the present step. Please refer to FIGS. 6A-6D which are schematic diagrams illustrating an embodiment of a first ring mark C11 and four second ring marks C21, C22, C26, C27 of the disclosure. The pairing unit 130 compares the first ring mark (such as C11) of the selected first feature point (such as P11) with the second ring marks (such as C21, C22, C26, C27) of the second feature points (such as P21, P22, P26, P27) one by one so as to obtain a matching quantity. For example, the relative angles of the first ring mark C11 are recorded as "90°, 135°, 202.5°", and the relative angles of the second ring mark C21 are recorded as "90°, 135°, 135°", so the matching quantity is 2.

In the course of the comparison process, the pairing unit 130 can further rotate each first ring mark or each second ring mark to maximize the matching quantity.

Then, the method proceeds to step S105, the pairing unit 130 pairs the first feature point and the second feature point whose matching quantity is greater than M being an integer greater than or equal to 1. For example, if M is equal to 1, then the first feature point P11 and the second feature point P22 can be paired.

In the above embodiment, a first feature point is selected from the first image first, and then several second feature points are selected from the second image latter for comparison. In another embodiment, a second feature point can be selected from the second image first, and then several second feature points are selected from the first image latter for comparison. Or, in another embodiment, both methods can be used.

According to steps S104-S105 of the above disclosure, the pairing unit 130 pairs the first feature points and the second feature points by a computer according to the first relationship and the second relationship, wherein in the present embodiment, the first relationship relates to the first ring mark of each first feature point, and the second relationship relates to the second ring marks of each second feature point.

Then, the method proceeds to step S106, the first feature points and the second feature points that are not paired are deleted by the screening unit 140.

Then, the method proceeds to step S107, whether N is smaller than a first predetermined value is determined. If N is smaller than the first predetermined value, then the method proceeds to step S108; otherwise, the method proceeds to step S109, the value of N is decreased. That is, the method repeats steps S103-S106 by progressively decreasing the value of N until the value of N reaches the first predetermined value.

In step S108, whether M is greater than a second predetermined value is determined. If M is greater than the second predetermined value, then the present method terminates; otherwise, the method proceeds to step S110, the value of M is increased. That is, the method repeats steps S103-S106 by progressively increasing the value of M until the value of M reaches the second predetermined value.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing method, comprising:
   (a) providing a first image having a plurality of first areas and a second image having a plurality of second areas, wherein each first area has a first feature point having the largest or the smallest grey value in the first area, and each second area has a second feature point having the largest or the smallest grey value in the second area;
   (b) creating a first relationship between the first feature points and a second relationship between the second feature points, wherein the step (b) comprises:
      (b1) creating a first ring mark for each first feature point, wherein each first ring mark records N first relative angles between the first feature point and its neighboring N first feature points, and N is an integer greater than or equal to 1; and
      (b2) creating a second ring mark for each second feature point, wherein each second ring mark records N second relative angles between the second feature point and its neighboring N second feature points; and
   (c) pairing the first feature points and the second feature points by a microprocessor according to the first and the second relationship.

2. The image processing method according to claim 1, wherein the step (c) comprises:
   (c1) comparing N first relative angles of each first ring mark with N second relative angles of each second ring mark to obtain a matching quantity; and
   (c2) pairing the first feature point and the second feature point whose matching quantity is greater than M being an integer greater than or equal to 1.

3. The image processing method according to claim 2, wherein the step (c1) further comprises rotating each first ring mark or each second ring mark so as to maximize the matching quantity.

4. The image processing method according to claim 2, further comprising:
   (d) deleting the first feature points and the second feature points that are not paired.

5. The image processing method according to claim 4, wherein the processing method repeats the step (b), the step (c) and the step (d) by progressively decreasing the value of N.

6. The image processing method according to claim 4, wherein the processing method repeats the step (b), the step (c) and the step (d) by progressively increasing the value of M.

7. The image processing method according to claim 1, wherein each of the first areas and the second areas is a rectangular area formed by a plurality of columns and a plurality of rows of pixels or a L-shaped area formed by a plurality of columns and a plurality of rows of pixels.

8. The image processing method according to claim 1, wherein each of the first areas and the second area is a bar-shaped area formed by one single column of pixels, a bar-shaped area formed by one single row of pixels, or a L-shaped area formed by one single column and one single row of pixels.

9. The image processing method according to claim 1, wherein the first image and the second image respectively are a left-eye image and a right-eye image viewed from different view angles.

10. The image processing method according to claim 1, wherein the first image and the second image respectively are two consecutive images at continuous time.

11. An image processing system, comprising:
    an image providing unit used for providing a first image having a plurality of first areas and a second image having a plurality of second areas, wherein each first area has a first feature point having the largest or the smallest grey value in the first area, and each second area has a second feature point having the largest or the smallest grey value in each second area in the second feature point;
    an information creating unit used for creating a first relationship between the first feature points and a second relationship between the second feature points, wherein the first relationship comprises a first ring mark of each first feature point and a second ring mark of each second feature point, each first ring mark records N first relative angles between each first feature point and its neighboring N first feature point, each second ring mark records N second relative angles between each second feature point and its neighboring N second feature point, and N is an integer greater than or equal to 1; and
    a pairing unit used for pairing the first feature points and the second feature points according to the first and the second relationship.

12. The image processing system according to claim 11, wherein the pairing unit compares N first relative angles of each first ring mark with N second relative angles of each second ring mark to obtain a matching quantity, and pairs the first feature point and the second feature point whose matching quantity is greater than M being an integer greater than or equal to 1.

13. The image processing system according to claim 12, wherein the pairing unit further rotates each first ring mark or each second ring mark so as to maximize the matching quantity.

14. The image processing system according to claim 12, further comprising:
    a screening unit used for deleting the first feature points and the second feature points that are not paired.

15. The image processing system according to claim 11, wherein each of the first areas and the second area is a rectangular area formed by a plurality of columns and a plurality of rows of pixels, or a L-shaped area formed by a plurality of columns and a plurality of rows of pixels.

16. The image processing system according to claim 11, wherein each of the first areas and the second areas is a bar-shaped area formed by one single column of pixels, a bar-shaped area formed by one single row of pixels, or a L-shaped area formed by one single column and one single row of pixels.

17. The image processing system according to claim 11, wherein the first image and the second image respectively are a left-eye image and a right-eye image viewed from different view angles.

18. The image processing system according to claim 11, wherein the first image and the second image respectively are two consecutive images at continuous time.

* * * * *